Figure 1:
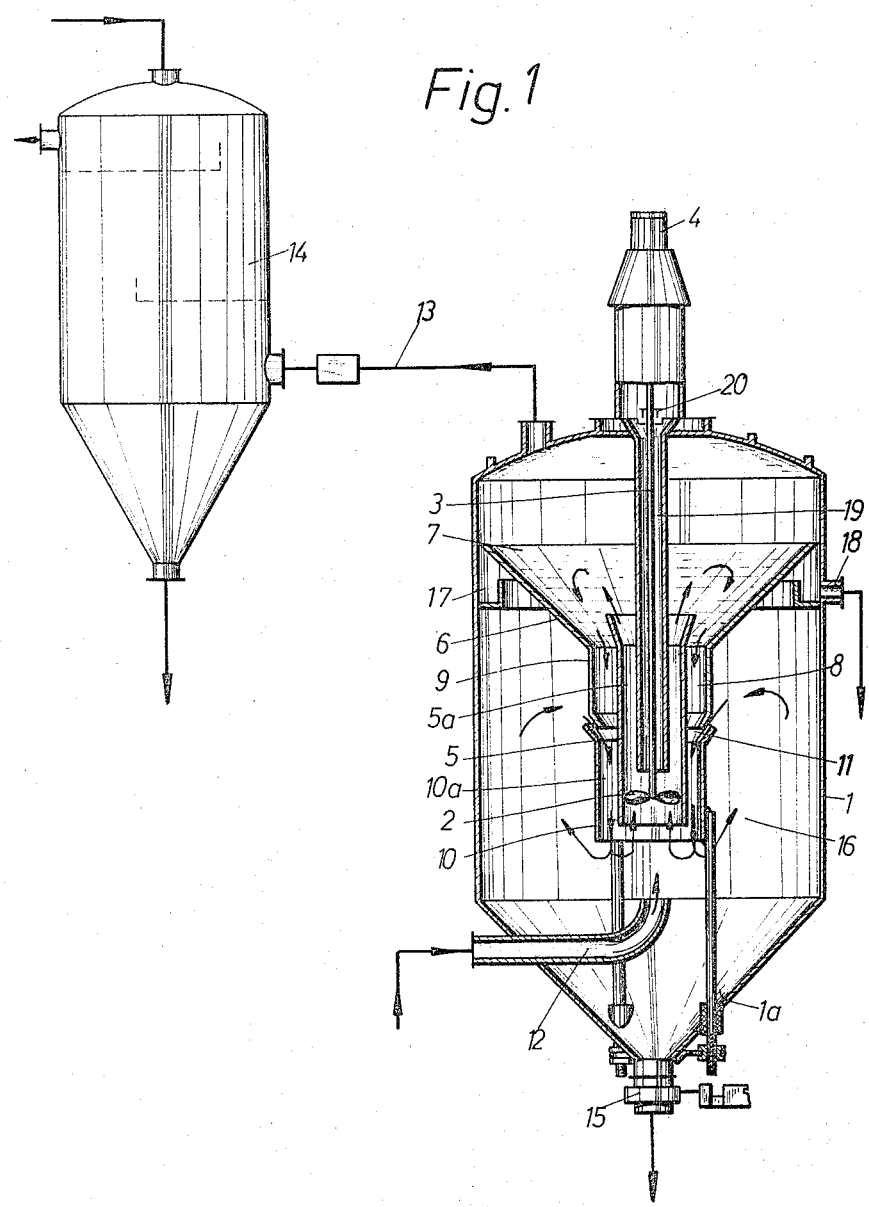

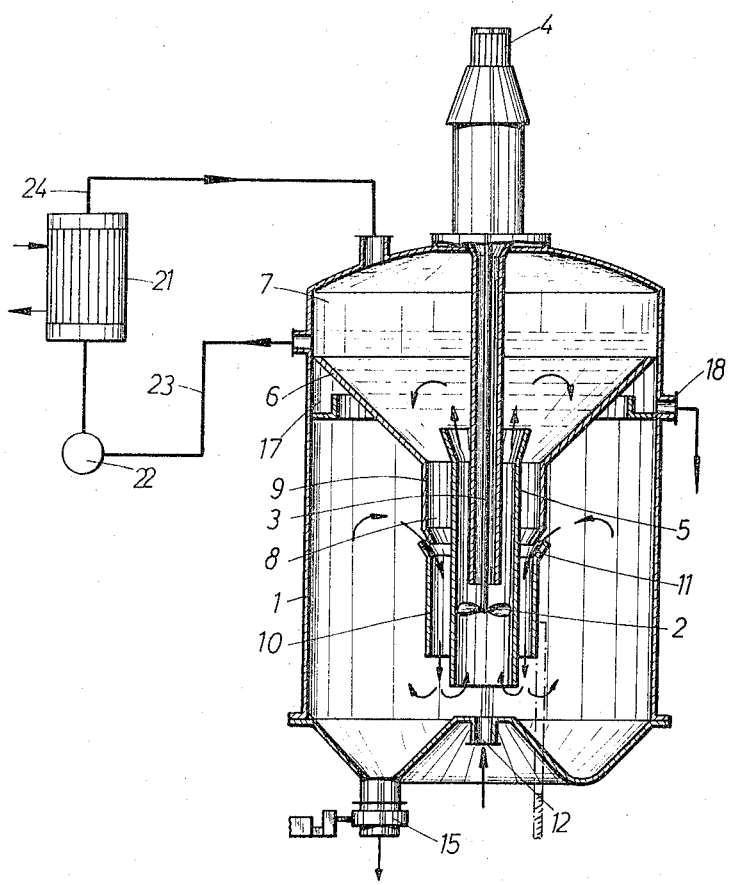

United States Patent Office 3,306,710
Patented Feb. 28, 1967

3,306,710
APPARATUS FOR CRYSTALLIZING SALTS AND SALT SOLUTIONS
Theodor Messing, Mulheim-Speldorf, Germany, assignor to Standard-Messo Duisburg Gesellschaft fur Chemietechnik m.b.H. & Co., Duisburg, Germany
Filed Nov. 2, 1964, Ser. No. 407,987
Claims priority, application Germany, Oct. 31, 1963, St 21,261
6 Claims. (Cl. 23—273)

The present invention relates to an apparatus for crystallizing salts or salt solutions, which apparatus comprises a guiding pipe for the salt solution, said guiding pipe receiving a propeller and leading into an evaporation chamber.

It is an object of the present invention to obtain a formation of coarse grains during the crystallization of salts or salt solutions.

It is another object of this invention to provide an apparatus for producing coarse grains when crystallizing salts and salt solutions.

It is still another object of this invention to provide an apparatus as set forth in the preceding paragraph which is simple in construction and operation.

These and other objects and advantages of the invention will appear more clearly from the following specification in connection with the accompanying drawings, in which:

FIGURE 1 diagrammatically illustrates a section through a crystallizing apparatus according to the invention;

FIGURE 2 diagrammatically shows a section through a modified crystallizing apparatus according to the invention.

In order to obtain the formation of coarse grains during a crystallization of salts or salt solutions, it is suggested according to the present invention, to surround the guiding pipe for the salt solution to be crystallized by an injector with a suction gap in such a way that a central flow to the evaporation chamber will be formed, and that from said central flow there will be formed a propellant flow for the injector as primary circuit and a slow secondary flow through the suction gap of the injector and the lower portion of the apparatus. Such injector is formed by two tubular members forming an annular chamber therebetween. With such an arrangement, the fresh, warm solution is introduced into the apparatus from below, whereas the upper surface of the solution in the crystallizing apparatus is under a vacuum, in a manner known per se. By means of such an apparatus, the salt crystals are repeatedly circulated by a propeller pump, thereby causing a growth of the salt crystals. This is due to the fact that the salt crystals in the circulating salt solution serve as nuclei on which the crystallization of the fresh solution starts. In this way, few new fine crystals form, and the formed crystals grow further.

According to a practical embodiment of the invention, the suction gap of the injector is adjustable, for instance by an axial displacement of the lower injector pipe. This makes it simple to adjust the speed of the secondary flow.

The conical insert in the evaporating chamber has below the outer marginal portion thereof provided an annular overflow groove for the clear solution.

The propeller shaft may advantageously be surrounded by a tubular member through which, when the stuffingbox is not tight, air or a blocking liquid may pass whereby the annular chamber between pump shaft and tubular member is kept free from crystallizing solution.

Referring now to the drawings in detail, the arrangement shown in FIG. 1 comprises a crystallizating apparatus 1 having a central shaft 3 carrying a propeller 2, said shaft 3 being adapted to be driven by a variable speed motor 4. In the central section of the crystallizer, there is provided a guiding pipe 5 which surrounds propeller 2 and propeller shaft 3. Guiding pipe 5 leads into a conical insert 6 by means of which the evaporating chamber 7 is closed toward the bottom. Guiding pipe 5 which, together with a tubular member 9 forms an annular chamber 8, is surrounded by an injector adjacent the conical evaporating chamber 7, said injector being formed by tubular members 9 and 10 between which there is provided a variable suction gap 11 of the injector.

The feeding pipe 12 for the warm, fresh solution leads below the inner tubular pipe 5 into a crystallizer.

The warm solution introduced into crystallizing apparatus 1 is by means of propeller 2 withdrawn from the lower portion of the apparatus and is conveyed through guiding pipe 5 immediately to the upper portion of the apparatus through the intervention of cone 6 into the evaporating chamber 7. The liquid level will be approximately up to the upper edge of the conical insert 6. In this portion there is effected the cooling-off of the solution by extending a portion of the solvent water directly from the surface of the liquid. The crystallizer is under a vacuum, and the obtained steam or vapor from the liquid being evaporated is passed through conduit 13 to the mixing condenser 14 where it is condensed. In this connection, it is important that the evaporation starts only shortly below the liquid surface, while this zone is located outside the guiding pipe 5. The cooling is such that the temperature drops below the saturation point of the solution whereby the crystallization is initiated. The cooled solution is now conveyed downwardly and passes into the annular chamber 8 of the injector. The solution which leaves this annular chamber at increased speed, passes into the injector pipe 10 which likewise forms an annular chamber. Thus, a primary flow circuit is formed which is composed of the flow circuit created by propeller 2 and of the central flow pressed through the annular chamber 5a and furthermore of the propelling flow passed from the evaporating chamber 7 downwardy through the injector. Liquid is now drawn in from the outside through gap 11 of the injector. This secondary flow intermixes with the primary flow and leaves the injector pipe 10 at the lower end thereof. The coarse salt crystals sink downwardly at the exit of the injector and are collected in the bottom cone 1a of the crystallizer. The salt is withdrawn in the form of a slurry through a valve 15 or the like.

It will thus be evident that also a secondary flow circuit is formed which passes through suction gap 11, annular chamber 10a of the injector, and the outer annular chamber 16. This flow is slower than the primary flow and serves for grain classification.

Annular gap 11 is adapted to be varied as to its crosssection during operation by means of adjusting pipe 10, so that the magnitude of the secondary flow may be varied. The adjustment is so effected that the speed in upward direction in the outer annular chamber 16 takes along the fine crystals only, whereas the coarse grains drop downwardly and are withdrawn.

A proper separation of solution and salt is effected in the upper liquid chamber below the conical insert 6 and is caused by the very slight flow-upward movement in said liquid chamber. The clear solution passes over an annular overflow groove 17 and is withdrawn as a clear solution through connection 18.

It will be appreciated that an apparatus according to the invention makes possible the growing of a coarse salt grain, while in the crystallizer itself a pre-thickening of the salt slurry and the withdrawal of a clear solution is made possible.

Shaft 3 of the propeller pump is surrounded by a tube 19 in order to prevent a sticking of salt to shaft 3. Inasmuch as slight quantities of air might pass through the stuffing-box 20, the liquid level in pipe 19 is pressed downwardly up to the lower edge. Here the air will trickle upwardly and to a certain extent will aid the circulating effect of the propeller pump. Stuffing-box 20 may also be provided with a locking fluid, for instance with warm water, so that in view of the current slight post-delivery due to the leakage of the stuffing-box, the space between propeller shaft 3 and pipe 19 will be kept free from crystallizing solution.

Whereas with the above-described embodiment, the cooling is effected by a vacuum evaporation and withdrawal of the specific heat from the solution, it is possible to employ the same apparatus in connection with solutions which, due to their ingredients or due to their unfavorable behavior at boiling temperature, are deep-cooled, advantageously not by vacuum evaporation. Solutions of this last-mentioned type are those which have a relatively great increase in the boiling point or decrease in the freezing point, for instance potassium nitrate in a nitric solution. With such solution, advantageously an apparatus is employed as is diagrammatically illustrated in FIG. 2. The structure of this apparatus is the same as in FIG. 1, and, therefore, similar parts have been designated with the same reference numerals. However, according to the arrangement of FIG. 2, the cooling by vacuum evaporation is replaced by an indirect cooling by means of brine refrigerating means. To this end, adjacent the apparatus 1 there is provided a heat exchange 21 which communicates with apparatus 1 through a circulating pump 22, a withdrawal pipe 23, and a pressure pipe 24 near the upper liquid level. The quantity of solution is at high speed conveyed through said heat exchanger 21 located outside the apparatus 1, so that the cooling output of the installation is effected at the same speed in the system where otherwise the cooling by vacuum would take place.

There are also arrangements possible which deposit salt not by cooling but by heating as, for instance, iron sulphate within the range of above 65° C. For solutions of this type, the same apparatus with an outer heat exchanger may be employed if, instead of the cooling means, heating means are provided.

It is, of course, to be understood that the present invention is, by no means, limited to the particular arrangement shown in the drawings, but also comprises any modifications within the scope of the appended claims.

What I claim is:
1. An apparatus for producing crystals from salt solution comprising a container means, a rotatable substantially vertical shaft in said container means, funnel shaped wall means connected to and extending downwardly from the sides of said container thereby subdividing said container means into an upper chamber and a lower chamber, said wall means being provided with a circular opening at its bottom concentric with said shaft, said lower chamber being provided with a solution inlet for admitting solution to be crystallized, first tubular means surrounding said shaft in spaced relation thereto and forming a first annular passage establishing liquid communication between said upper and lower chambers, blade means rotatably connected to said shaft and located within said first annular passage for drawing solution from said lower chamber and conveying the solution through the first annular passage to said upper chamber, second tubular means arranged within said lower chamber and surrounding said first tubular means in spaced concentric relation thereto, said second tubular means being connected to said wall means at the circular opening at the bottom of said wall means and defining with said first tubular means a second annular passage in liquid communication between said upper and lower chambers, said second tubular means being provided with an inwardly converging bottom end for directing downward flowing solution in the second annular passage inwardly toward said first tubular means, third tubular means located directly below said second tubular means and concentric with said first tubular means, said third tubular means being provided with an outwardly flaring top end spaced slightly below said inwardly flaring end of said second tubular means thereby providing a suction gap establishing communication between said lower chamber and said second annular passage.

2. The apparatus in claim 1 wherein said third annular means is adapted to be moved up and down to allow variation of the suction gap.

3. The apparatus in claim 1 wherein said lower chamber is provided with overflow means located between said funnel shaped wall means and the sides of said container means for discharging clear solution from said lower chamber.

4. The apparatus in claim 1 wherein said rotatable shaft extends vertically downwardly into said container and is provided with a stuffing box, and is surrounded by a pipe extending down into said container means, where said shaft passes through said container means, said stuffing box and said pipe being adapted to permit passage of fluid into said pipe to thereby prevent solution from entering said pipe.

5. Apparatus as in claim 1 wherein a vacuum means is connected to said container means near the top of said upper chamber for drawing a vacuum on said upper chamber.

6. Apparatus as in claim 1 wherein said upper chamber is provided with a liquid outlet adjacent the top of said funnel shaped wall, said outlet being connected in series with pump means, heat exchange means, and a liquid inlet discharging into said upper chamber above said liquid outlet means.

References Cited by the Examiner

UNITED STATES PATENTS

| 1,945,281 | 1/1934 | Leithauser | 159—25 X |
| 3,071,447 | 1/1963 | Bernhardi | 23—273 |

FOREIGN PATENTS 166,897  12/1905  Germany.

NORMAN YUDKOFF, *Primary Examiner.*

S. J. EMERY, *Assistant Examiner.*